June 16, 1936.    G. A. TUCK    2,044,371
HEATING FURNACE
Filed June 19, 1935    2 Sheets-Sheet 1
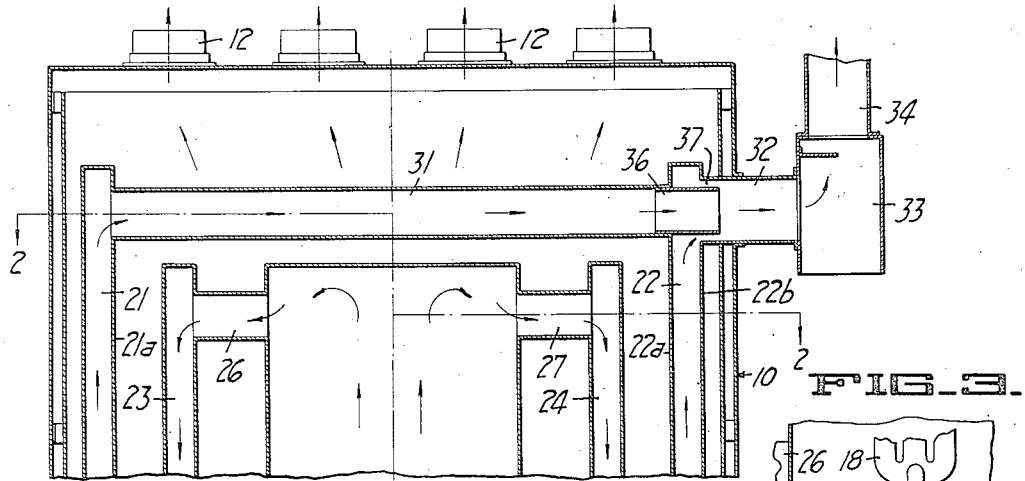
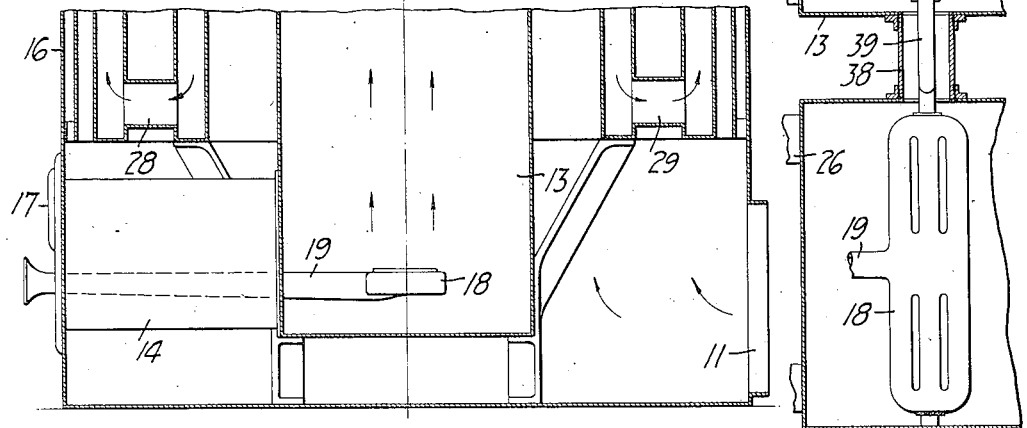
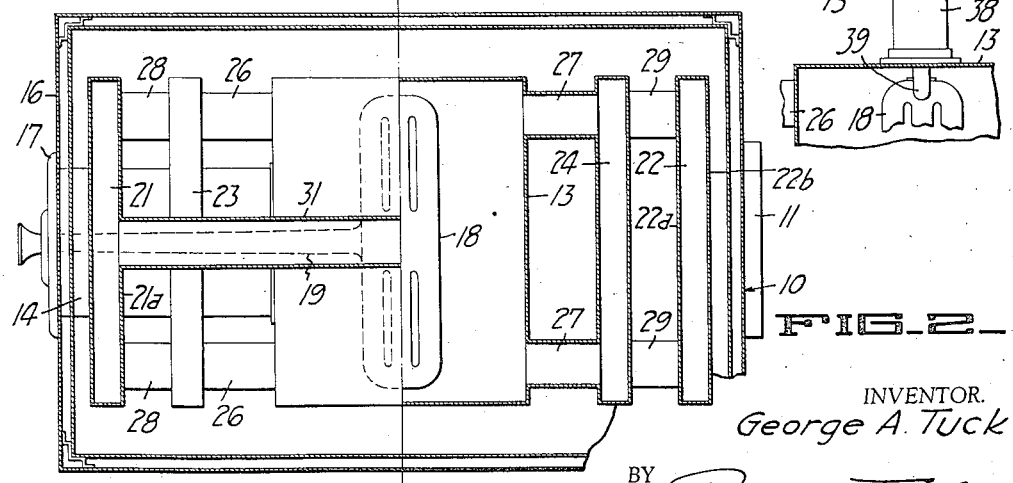
INVENTOR.
George A. Tuck
BY
Paul D. Flehr
ATTORNEY.

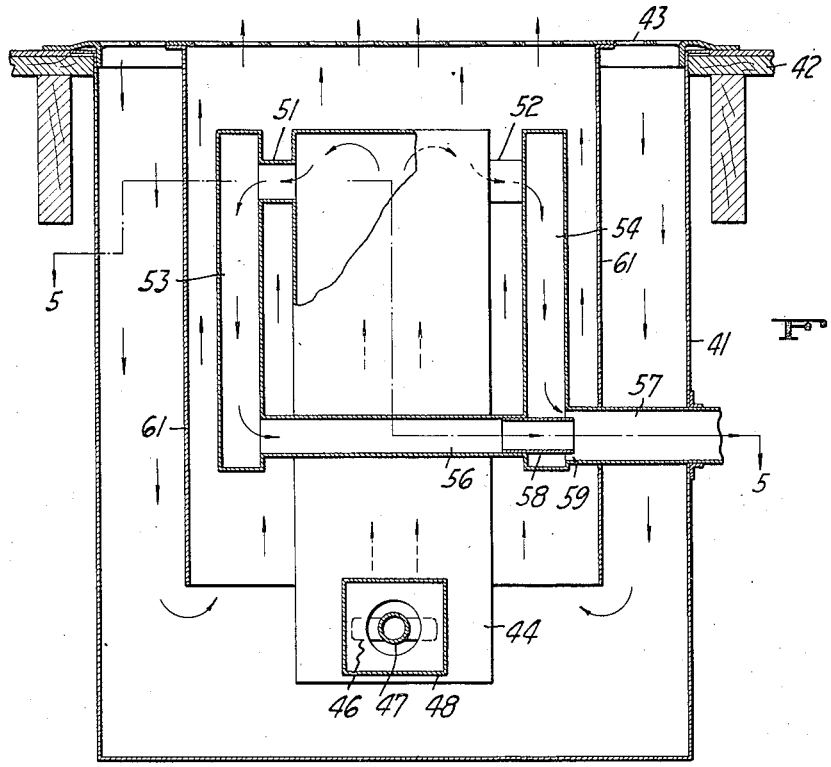
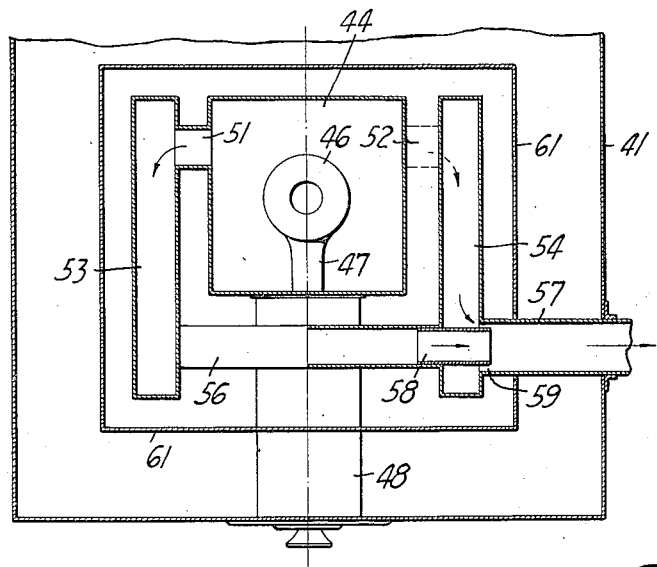

Patented June 16, 1936

2,044,371

UNITED STATES PATENT OFFICE 2,044,371

HEATING FURNACE

George A. Tuck, San Francisco, Calif.

Application June 19, 1935, Serial No. 27,367

8 Claims. (Cl. 126—99)

This invention relates generally to hot air furnaces such as are adapted for domestic heating purposes.

It is an object of the invention to provide a furnace of the above character which can be readily installed in multiple units without difficulty in making connections to a common chimney or draft pipe.

It is a further object of the invention to afford a simple but effective means for insuring proper balanced flow through heat transferring sections of a furnace unit, and which will enable maintenance of such a balance after once being established, irrespective of operation in conjunction with other units of a complete installation.

Another object of the invention is to provide an efficient furnace which can be readily manufactured in units of standardized sizes, and which on particular installations can be readily assembled in various combinations to provide a wide range of heating capacities.

Further objects of the invention will appear from the following description, in which the preferred embodiments of the invention have been set forth in detail in conjunction with the accompanying drawings.

Referring to the drawings:

Fig. 1 is a side elevational view, in cross-section, illustrating a heating furnace incorporating the present invention.

Fig. 2 is a cross-sectional view taken along the line 2—2 of Fig. 1.

Fig. 3 is a cross-sectional detail, in plan, showing the manner in which various units can be coupled together.

Fig. 4 is a side-elevational view, in cross-section, showing the present invention incorporated in a furnace of the floor type.

Fig. 5 is a cross-sectional view taken along the line 5—5 of Fig. 4.

Referring first to the furnace as illustrated in Figs. 1 and 2, it consists of a metal housing 10, which is provided with the usual cold air intake 11, and hot air ducts 12 leading to the several rooms or spaces to be heated. Positioned within the housing 10 there is a generally upright combustion chamber 13, which is formed of suitable heat conducting material such as sheet metal, and which can conveniently be rectangular in transverse contour, as shown in Fig. 2. An extension 14 connects with the lower part of chamber 13 and opens through the front wall 16 of the housing, where it is provided with a suitable closure door 17. A suitable gas burner 18 is shown disposed in the lower part of the combustion chamber, and the manifold pipe 19 connected to this burner is shown projecting through the front side of the furnace through the extension 14.

Disposed on opposite sides of the combustion chamber 13 are the heat exchange sections 21, 22, 23 and 24. These sections are all formed of suitable heat-transferring material, such as sheet metal, and are arranged in generally upright position. The upper part of the combustion chamber 13 is connected to sections 23 and 24 by pipes 26 and 27. Sections 21 and 24 have their lower portions connected by pipes 28, and sections 22 and 24 are similarly connected by pipes 29. In place of four or more such heat exchange sections, a single pair may suffice, with the two sections on opposite sides of the combustion chamber.

It will be noted that sections 21 and 22 extend to a height greater than the top of the combustion chamber 13. These upper portions of sections 21 and 22 are directly connected by the laterally extending pipe 31. The ends of pipe 31 communicate through the opposed inner and vertical walls 21a and 22a, respectively, of the sections 21 and 22.

Extending through the back side of the housing 10 there is a flue pipe 32, which is at least twice the cross-sectional area of the pipe 31. This pipe 32 is preferably aligned with the axis of pipe 31, and communicates with section 22 through the outer or rear vertical wall 22b of the same. The outer end of pipe 32 is shown connected to a conventional draft hood 33, which in turn connects to the draft pipe 34.

It is evident from the above that hot products of combustion from the gas flame in combustion chamber 13 flow in opposite directions through the two pipes 26 and 27, downwardly through heat exchange sections 23 and 24, laterally through the pipes 28 and 29, and then upwardly through the heat exchange sections 21 and 22. Products of combustion flowing through the heat exchange sections 21 and 23 must traverse the pipe 31 before passing to the flue pipe 32. Therefore, unless provision is made to properly equalize the flow of products of combustion, a greater flow will occur through the heat exchange sections 22 and 24, with resulting unbalanced and inefficient operation of the furnace. In order to secure equalized flow, means is provided serving to control flow of products of combustion from section 22 to the pipe 32. A convenient means of this character consists of a short pipe section 36, which is telescopically and slidably engaged in the adjacent end of pipe 31. When the position of pipe section 36 is properly adjusted, flow of products of combustion from the heat exchange section 22 must flow through the annular opening 37, thus affording sufficient flow resistance to compensate for the flow resistance of pipe 31. Thus, with pipe section 36 properly adjusted to secure balanced operation, the temperature of gas flowing from pipe 31 will be the same as the temperature of gas from section 22 flowing through the annular opening 37. Instead of providing such an adjustment pipe section 36 may be of proper selected size, to afford the desired character of flow control.

The combustion chamber, together with the heat exchange units described and their connections, can be manufactured in units of standardized sizes, for various heating capacities. Where a heating capacity is desired for a given installation, which is considerably greater than can be provided by one unit, two or more of such units can be readily coupled together and incorporated in a single housing 10. Thus, as indicated in Fig. 3, two units can be disposed side by side, with the lower side portions of the combustion chambers 13 connected by pipes 38. Flame can be bridged across from one burner 18 to the next by supplemental burners 39 extending through the pipes 38. The flue pipes 32 of the several units may be provided with individual draft hoods which in turn are all connected to a common chimney or draft pipe. With flame being bridged between the several burners, a single pilot burner and its customary control mechanism will suffice. Instead of forming units of a single size, it is practicable to form units to, say, three or more different sizes, which, when grouped together in various combinations, will afford a range of heating capacities ample for any type of heating installation. In spite of the use of units of different sizes, each unit will maintain itself in proper balanced operation, even though the combustion chambers of the different units may be interconnected, as explained above, by the pipes 38.

Where one heat exchange section is employed in place of the two sections 21 and 23, and a like single section is employed in place of sections 22 and 24, the lower portions of the sections are connected to the lower portion of the combustion chamber, whereby combustion products from the burner must travel upwardly and then downwardly, before flowing to the heat exchange sections.

The floor type furnace illustrated in Figs. 4 and 5 is constructed as follows:—An outer housing 41 has its upper open end registering with an opening in the floor 42, with the floor opening covered by a grill 43. Below the grill and within the housing 41 there is an upright combustion chamber 44, corresponding to the combustion chamber 13 of Figs. 1 and 2. A gas burner 46 is disposed in the lower part of this chamber and has its manifold 47 projecting through the lower lateral extension 48, or extending down through the bottom of the housing (with extension 48 omitted). Pipes 51 and 52 serve to connect the upper part of chamber 44 with the heat exchange sections 53 and 54. The lower ends of sections 53 and 54 are directly connected by the laterally extending pipe 56. Flue pipe 57 connects with heat exchange section 54 and extends through one side wall of the housing 41. Pipe section 58, corresponding to the pipe section 36 of Figs. 1 and 2, is slidably and telescopically engaged with the adjacent end of pipe 56 and also extends into flue pipe 57 to form the annular flow control opening 59. Baffle walls 61 extend downwardly from the grill 43, so that cold air from the room being heated flows downwardly between these baffle walls and the side walls of the housing 41, and then upwardly about the combustion chamber 44 and the heat exchange sections 53 and 54. With this modification, proper adjustment of pipe 58 likewise insures balanced flow of products of combustion to the flue pipe 57, and the flue pipe 57 extends from the housing 41 at a convenient point for connection with a draft box and draft pipe.

I claim:

1. In a hot air heating furnace, an upright combustion chamber formed of heat transferring metal walls, at least two heat exchange sections disposed on opposite sides of the combustion chamber, each of said sections providing a flow path for hot products of combustion and being formed of metal walls, means serving to connect the combustion chamber with both said sections, a laterally extending pipe directly connecting said sections together, a flue pipe connected through a wall of only one of said sections, means communicating said laterally extending pipe with the flue pipe and serving to control flow of products of combustion from the interior of said one section to said flue pipe whereby flow of products of combustion through both said sections is equalized, and a housing surrounding both the combustion chamber and said heat exchange sections, said housing being provided with cold air inflow and hot air outflow openings.

2. In a hot air heating furnace, an upright combustion chamber formed of heat transferring metal walls, at least two heat exchange sections disposed on opposite sides of the combustion chamber, each of said sections providing a flow path for hot products of combustion and being formed of metal walls, means serving to connect the combustion chamber with both said sections, a laterally extending pipe directly connecting between said sections, a flue pipe connected through a wall of only one of said sections, said flue pipe being aligned with said laterally extending pipe, means communicating said laterally extending pipe with the flue pipe and serving to control flow of products of combustion from the interior of said one section to said flue pipe, without, however, effecting flow of products of combustion from said laterally extending pipe to said flue pipe, whereby flow of products of combustion through both said sections is equalized, and a housing surrounding the combustion chamber and said sections, said housing having cold air inflow and hot air outflow openings.

3. In a hot air heating furnace, an upright combustion chamber formed of heat transferring metal walls, at least two heat exchange sections disposed in upright position on opposite sides of the combustion chamber, each of said sections providing a flow path for hot products of combustion and being formed of metal walls, means serving to connect the combustion chamber with both said sections, a laterally extending pipe connecting said sections together, the ends of said pipe communicating with said sections through oppositely faced inner vertical walls of the same, a flue pipe connected through an outer vertical wall of only one of said sections, said flue pipe being aligned with said laterally extending pipe, means communicating said laterally extending pipe with the flue pipe and serving to control flow of products of combustion from the interior of said one section to said flue pipe, without, however, interfering with flow of products of combustion from said laterally extending pipe to said flue pipe, whereby flow of products of combustion through both said sections is equalized, and a housing surrounding the combustion chamber and said sections, said housing having cold air inflow and hot air outflow openings.

4. In a hot air heating furnace, an upright combustion chamber formed of heat transferring metal walls, at least two heat exchange sections disposed on opposite sides of the combustion chamber, each of said sections providing a flow path for hot products of combustion and being likewise formed of metal walls, means serving to connect the combustion chamber with said sections, a laterally extending pipe directly connecting said sections together, the ends of said pipe communicating with the inner, oppositely faced vertical walls of said sections, a flue pipe connected through an outer vertical wall of only one of said sections, said flue pipe being aligned with said laterally extending pipe, a pipe section telescopically and slidably engaged with one end portion of said laterally extending pipe and projecting into said flue pipe, whereby flow of products of combustion from the interior of said one section is controlled to effect equalized flow of products of combustion through both said sections, and a housing surrounding said combustion chamber and said sections, said housing having cold air inflow and hot air outflow openings.

5. In a hot air heating furnace, a housing having cold air inflow and hot air outflow openings, a generally upright combustion chamber disposed within the housing and formed of heat transferring metal walls, a lateral extension from the lower portion of said chamber opening through the front side of the housing, at least two heat exchange sections disposed within said housings, one of said sections being disposed between the front wall of the housing and the combustion chamber, and the other section being between the rear side of the housing and the combustion chamber, means including pipes forming passages for connecting the combustion chamber with the heat transferring sections, a laterally extending pipe directly connecting said sections together, the ends of said laterally extending pipe opening through the inner opposed walls of said sections, a flue pipe connecting through the rear wall of said second section, and means communicating said laterally extending pipe with the flue pipe and serving to control flow of products of combustion from the second section to said flue pipe whereby flow of products of combustion through both said sections is equalized.

6. In a hot air heating furnace of the floor type, a housing having cold air inflow and hot air outflow openings, a generally upright combustion chamber formed of heat transferring walls and disposed within said housing, at least two upright heat exchange sections likewise disposed within said housing and on opposite sides of the combustion chamber, each of said sections providing a flow path for hot products of combustion and being formed of metal walls, pipes serving to connect the upper part of the combustion chamber with the upper portions of said sections, a flue pipe connected to one of said sections, a laterally extending pipe directly connecting said sections together, and means communicating said laterally extending pipe with the flue pipe and serving to control flow of products of combustion from said one section to said flue pipe whereby flow of products of combustion through both said sections is equalized.

7. In a hot air heating furnace, an upright combustion chamber formed of heat transferring metal walls, at least two heat exchange sections disposed on opposite sides of the combustion chamber, each of said sections providing a flow path for hot products of combustion and being likewise formed of metal walls, means serving to connect the combustion chamber with said sections, a laterally extending pipe directly connecting said sections together, the ends of said pipe communicating with the inner, oppositely faced vertical walls of said sections, a flue pipe connected through an outer vertical wall of only one of said sections, said flue pipe being substantially aligned with said laterally extending pipe, means providing substantially unrestricted communication between the flue pipe and the adjacent end of the laterally extending pipe, through said one section, and also providing restricted communication between the flue pipe and said one section, and a housing surrounding said combustion chamber and said sections, said housing having cold air inflow and hot air outflow openings.

8. In a hot air heating furnace of the floor type, a housing having cold air inflow and hot air outflow openings, a generally upright combustion chamber formed of heat transferring walls and disposed within said housing, at least two upright heat exchange sections likewise disposed within said housing and on opposite sides of the combustion chamber, each of said sections providing a flow path for hot products of combustion and being formed of metal walls, pipes serving to connect the upper part of the combustion chamber with the upper portions of said sections, a laterally extending pipe directly connecting the lower portions of said sections together, said pipe being located adjacent one side of the combustion chamber and the ends of said pipe communicating through the inner oppositely faced vertical walls of said sections, and a flue pipe connected through an outer vertical wall of only one of said sections, said last named point of communication being substantially aligned with the axis of said laterally extending pipe, whereby said flue pipe receives products of combustion both directly from said one section and from the other section through said laterally extending pipe.

GEORGE A. TUCK.